US 12,324,998 B2

(12) United States Patent
Mitchell

(10) Patent No.: US 12,324,998 B2
(45) Date of Patent: Jun. 10, 2025

(54) LIQUID SOLID SEPARATOR RECIRCULATION SYSTEMS

(71) Applicant: John Christopher Mitchell, League City, TX (US)

(72) Inventor: John Christopher Mitchell, League City, TX (US)

(*) Notice: Subject to any disclaimer, the term of this patent is extended or adjusted under 35 U.S.C. 154(b) by 521 days.

(21) Appl. No.: 17/535,618

(22) Filed: Nov. 25, 2021

(65) Prior Publication Data

US 2022/0080336 A1 Mar. 17, 2022

Related U.S. Application Data

(63) Continuation-in-part of application No. 14/470,794, filed on Aug. 27, 2014, now Pat. No. 11,213,772.

(51) Int. Cl.
 *B01D 33/04* (2006.01)
 *B01D 33/70* (2006.01)

(52) U.S. Cl.
 CPC ............ *B01D 33/04* (2013.01); *B01D 33/705* (2013.01)

(58) Field of Classification Search
 CPC ...... B01D 33/705; B01D 33/04; B01D 33/11; B01D 33/50; B01D 33/763
 See application file for complete search history.

(56) References Cited

U.S. PATENT DOCUMENTS

| | | | | |
|---|---|---|---|---|
| 1,789,425 A | * | 1/1931 | Cabrera | B01D 33/50 204/276 |
| 1,920,158 A | * | 7/1933 | Albertson | E02B 8/026 210/159 |
| 2,102,570 A | * | 12/1937 | Lind | E02B 8/026 210/162 |
| 2,885,080 A | * | 5/1959 | Myron | B08B 3/14 210/411 |
| 3,225,928 A | * | 12/1965 | Black | B01D 33/807 210/411 |
| 3,506,128 A | * | 4/1970 | Pashaian | B01D 29/90 210/387 |
| 3,526,589 A | * | 9/1970 | Swanson | B01D 33/04 210/247 |
| 4,042,507 A | * | 8/1977 | Langmack | B01D 33/04 210/160 |
| 4,191,653 A | * | 3/1980 | Hampton | B01D 33/04 210/396 |

(Continued)

FOREIGN PATENT DOCUMENTS

CN 109200667 A * 1/2019 ........... B01D 33/067

OTHER PUBLICATIONS

Press-seal, Kwik Seal, 2019, pp. 1-9 (Year: 2019).*
Zheng, CN109200667 A., English machine translation (Year: 2019).*

*Primary Examiner* — Robert J Popovics
(74) *Attorney, Agent, or Firm* — Patent CEO LLC; Phillip Vales

(57) ABSTRACT

A liquid solid separator has a main container wherein a rotating filter belt receives influent for liquid sold mixture sieve processing. Various recirculation systems are proposed including an external pump sump, internal pump recirculation and dual pumps with one disposed externally in a sump and one internally in the lower basin of the container. Recirculation points include an inflow pipe connection, an influent basin connection located above the influent basin and influent basin connection located underneath the liquid solid mixture influent level.

20 Claims, 9 Drawing Sheets

(56) References Cited

U.S. PATENT DOCUMENTS

| | | | | |
|---|---|---|---|---|
| 4,243,527 A * | 1/1981 | Leonard | B01D 29/90 | |
| | | | 210/801 | |
| 4,310,414 A * | 1/1982 | Lux | B01D 33/04 | |
| | | | 210/406 | |
| 4,731,180 A * | 3/1988 | Huff | B01D 29/01 | |
| | | | 209/387 | |
| 5,202,017 A * | 4/1993 | Hunter | B01D 33/807 | |
| | | | 210/86 | |
| 5,624,579 A * | 4/1997 | Bratten | B01D 29/096 | |
| | | | 210/387 | |
| 5,802,961 A * | 9/1998 | Hay | A23L 3/185 | |
| | | | 366/136 | |
| 5,832,873 A * | 11/1998 | Tu | A01K 1/0146 | |
| | | | 119/447 | |
| 5,921,399 A * | 7/1999 | Bakula | B01D 33/056 | |
| | | | 209/390 | |
| 6,026,765 A * | 2/2000 | Tu | A01K 1/01 | |
| | | | 119/479 | |
| 6,035,996 A * | 3/2000 | Swift | B65G 45/22 | |
| | | | 198/495 | |
| 6,244,362 B1 * | 6/2001 | Williams | B01D 33/04 | |
| | | | 210/418 | |
| 6,250,476 B1 * | 6/2001 | Kroon | B07B 1/55 | |
| | | | 209/390 | |
| 6,357,576 B1 * | 3/2002 | Enomoto | B01D 21/2461 | |
| | | | 210/531 | |
| 6,494,167 B1 * | 12/2002 | Chen | B01D 29/6484 | |
| | | | 119/447 | |
| 6,601,691 B1 * | 8/2003 | Enomoto | B23Q 11/0057 | |
| | | | 198/495 | |
| 6,695,122 B2 * | 2/2004 | Enomoto | B23Q 11/0057 | |
| | | | 210/531 | |
| 6,899,807 B2 * | 5/2005 | Cummings | B01D 29/6476 | |
| | | | 210/531 | |
| 6,942,786 B1 * | 9/2005 | Fosseng | B01D 33/056 | |
| | | | 210/393 | |
| 8,302,780 B1 * | 11/2012 | Mitchell | B01D 33/41 | |
| | | | 210/791 | |
| 8,974,662 B2 * | 3/2015 | Gannon | C02F 1/285 | |
| | | | 210/170.03 | |
| 9,114,340 B2 * | 8/2015 | Smith | B01D 33/04 | |
| 10,029,195 B2 * | 7/2018 | Strain | B01D 33/804 | |
| 10,160,679 B2 * | 12/2018 | Cote | C02F 3/1268 | |
| 10,293,278 B2 * | 5/2019 | Mans | C02F 1/24 | |
| 10,688,420 B2 * | 6/2020 | Strain | B01D 33/04 | |
| 10,786,766 B2 * | 9/2020 | Strain | B01D 33/52 | |
| 11,213,772 B2 * | 1/2022 | Mitchell | B01D 33/11 | |
| 11,389,754 B2 * | 7/2022 | Santoro | B01D 33/806 | |
| 11,628,386 B2 * | 4/2023 | Tashiro | B01D 33/073 | |
| | | | 210/784 | |
| 11,850,554 B2 * | 12/2023 | Cote | C02F 1/004 | |
| 12,140,139 B2 * | 11/2024 | Gannon | F04B 15/02 | |
| 12,226,712 B2 * | 2/2025 | Gannon | C02F 1/281 | |
| 12,285,707 B2 * | 4/2025 | Mitchell | B01D 33/04 | |
| 2002/0134648 A1 * | 9/2002 | Enomoto | B23Q 11/0057 | |
| | | | 198/495 | |
| 2003/0230520 A1 * | 12/2003 | Cummings | B01D 29/6476 | |
| | | | 210/162 | |
| 2010/0224574 A1 * | 9/2010 | Youngs | B01D 33/646 | |
| | | | 210/780 | |
| 2011/0089122 A1 * | 4/2011 | Smith | B01D 33/056 | |
| | | | 210/774 | |
| 2013/0161270 A1 * | 6/2013 | Stedman | B01D 33/0058 | |
| | | | 210/770 | |
| 2013/0213904 A1 * | 8/2013 | Mitchell | B01D 33/76 | |
| | | | 210/400 | |
| 2014/0021137 A1 * | 1/2014 | Smiddy | C02F 1/281 | |
| | | | 210/663 | |
| 2015/0060341 A1 * | 3/2015 | Mitchell | B01D 33/705 | |
| | | | 210/197 | |
| 2015/0157965 A1 * | 6/2015 | Strain | B01D 33/64 | |
| | | | 210/104 | |
| 2015/0182889 A1 * | 7/2015 | Strain | B01D 33/466 | |
| | | | 210/791 | |
| 2016/0002081 A1 * | 1/2016 | Cote | C02F 11/02 | |
| | | | 210/151 | |
| 2016/0002083 A1 * | 1/2016 | Cote | C02F 3/02 | |
| | | | 210/259 | |
| 2016/0152499 A1 * | 6/2016 | Ogawa | C02F 3/1242 | |
| | | | 210/620 | |
| 2017/0072345 A1 * | 3/2017 | Syed | B01D 33/04 | |
| 2017/0088449 A1 * | 3/2017 | Cote | C02F 1/004 | |
| 2017/0113163 A1 * | 4/2017 | Mans | B01D 36/04 | |
| 2017/0136393 A1 * | 5/2017 | Strain | C02F 1/001 | |
| 2017/0189836 A1 * | 7/2017 | Strain | B01D 29/096 | |
| 2018/0318736 A1 * | 11/2018 | Santoro | C02F 1/008 | |
| 2018/0361281 A1 * | 12/2018 | Bogardus | B65G 23/44 | |
| 2019/0135667 A1 * | 5/2019 | Cote | C02F 3/1268 | |
| 2022/0080336 A1 * | 3/2022 | Mitchell | B01D 33/04 | |
| 2022/0080338 A1 * | 3/2022 | Mitchell | B01D 33/807 | |
| 2022/0196012 A1 * | 6/2022 | Gannon | F04B 53/20 | |
| 2024/0091708 A1 * | 3/2024 | Cote | C02F 1/004 | |
| 2025/0012273 A1 * | 1/2025 | Gannon | F04B 15/02 | |

* cited by examiner

LIQUID SOLID SEPARATOR RECIRCULATION SYSTEMS

CROSS REFERENCE TO RELATED APPLICATION

This application claims benefit of previously filed U.S. Non-Provisional patent application Ser. No. 14/470,794 entitled Liquid Solid Separator that was filed on 27 Aug. 2014, this patent application is hereby incorporated by reference in its entirety.

FIELD OF THE INVENTION

The invention herein described relates to devices for the separation of solids from liquids. More particularly, this invention relates to recirculation systems that are external or internal to liquid solid separators.

BACKGROUND OF THE INVENTION

General Prior Art Concept

Gravity Flow Rotating Belt Filters is a class of system that feeds raw water onto the rotating belt filter via gravity. This system class is common in water treatment plants that incorporate a full water treatment process before and after the rotating filter belt. In this regard, an original raw liquid solid mixture undergoes treatment processes prior (a pre-treatment) to arriving at the rotating belt filter; typically called headworks, these treatment processes include coarse and fine screening sub-systems. The liquid solid mixture having been processed by this pre-treatment enters the liquid solid separator and is processed therein.

Upon exiting the liquid solid separator and its associated rotating belt filter, final processing is accomplished in another unit or system. This is usually considered secondary treatment with the introduction of biologicals and aeration for further purification of the liquids and solids therewith. These Gravity Flow Rotating Filter Belt systems are common for municipal water treatment plants and eliminates pumping between different treatment processes.

Pumped Flow Rotating Belt Filters are more commonly used for pre-treatment in industrial settings. Typically, all industrial plant waste waters are collected in a sump from various places/processes in the industrial plant then these are pumped into the Rotating Belt Filter Liquid Solid Separator for screening. Headworks are usually not present and secondary treatment is optional depending on the type of wastewater and the local requirements of the local municipality. If the industrial operators are discharging directly to the environment, a NPDES permit (issued by the EPA or State DNR) will typically dictate the discharge requirements, which normally will require secondary treatment, tertiary treatment and disinfection treatment.

There are liquid solid separator systems having rotating belt filters that utilize internal sump pumps to recycle reject streams. Using a sump pump internal to the liquid solid separator eliminates the need for another handler unit for additional processing of reject waste streams. However, the use of an internal pump creates various maintenance issues which needs to be solved in order to reliably to use the liquid solid separator.

A critical problem with an internal sump pump in a liquid solid separator is that the pump sometimes fails and inspection, maintenance or replacement of the pump requires downtime and the provision of specialized equipment and personnel for accessibility and repair thereof. Additionally, repeated breakdowns and downtime cost more to the operator.

Accordingly, there needs to be some solutions to overcome the aforementioned problems discussed above.

SUMMARY OF THE INVENTION

The present invention overcomes the deficiencies of the known art and the problems that remain unsolved by providing:

A liquid solid separator recycling system comprising:
a container having
an influent basin integrally attached to the container;
a sump external to the container;
a pump located in the sump having a pipe attached thereto wherein the pipe is also attached to a connector on the container.

In another aspect, further comprising:
the connector located on a side of the container above the influent basin.

In another aspect, further comprising: the connector located above a highest overflow weir.

In another aspect, further comprising: the connector located above the maximum normal operating liquid level.

In another aspect, further comprising:
the connector located on a side of container within a zone considered the influent basin.

In another aspect, further comprising:
the connector located on a side of container below the overflow weir and within a zone considered the influent basin.

In another aspect, further comprising:
the inlet pipe attached to an inlet pipe flowing into the influent basin.

A liquid solid separator recycling system comprising:
a container having
an influent basin integrally attached to the container;
a lower basin internal to the container;
a pump located in the lower basin having a pipe attached thereto wherein the pipe is also attached to a connector on the container.

In another aspect, further comprising:
the connector located on a side of the container above the influent basin.

In another aspect, further comprising: the connector located above a highest overflow weir.

In another aspect, further comprising: the connector located above the maximum normal operating liquid level.

In another aspect, further comprising:
the connector located on a side of container within a zone considered the influent basin.

In another aspect, further comprising:
the connector located on a side of container below an overflow weir and within a zone considered the influent basin.

In another aspect, further comprising:
an outflow line receiving treated liquids.

In another aspect, further comprising:
the connector attached to an inlet pipe attached to the container.

In another aspect, further comprising:
the inlet pipe attached to an inlet pipe flowing into the influent basin.

A liquid solid separator recycling system comprising:
a container having
an influent basin integrally attached to the container;

a lower basin internal to the container;
a sump located external to the container;
a first pump located in the sump wherein the pump is attached to a first connector associated with the container.

In another aspect, further comprising:
a lower basin overflow line having an outlet to the sump; and
a lower basin drain line having an outlet to the sump.

In another aspect, further comprising:
wherein the first connector is from a group of connectors of: the connector associated with an inlet pipe attached to an inlet pipe flowing into the influent basin, the connector associated with an inlet pipe attached to the container, the connector associated with a side of the container above the influent basin, the connector located on a side of the container above the influent basin, the connector located above the maximum normal operating liquid level, the connector located above a highest overflow weir, the connector located on a side of the container within a zone considered the influent basin, and the connector located on a side of container below an overflow weir and within a zone considered the influent basin.

In another aspect, further comprising:
another connection wherein the another connection is from a group of connections of: another pump internal to the container connected to a second connection different than the first connector, the first connector associated with an inlet pipe flowing into the influent basin as well as the another connection being a unified line of a lower basin overflow line along with a lower basin drain line having an outlet to the sump.

These and other aspects, features, and advantages of the present invention will become more readily apparent from the attached drawings and the following detailed description of the preferred embodiments.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
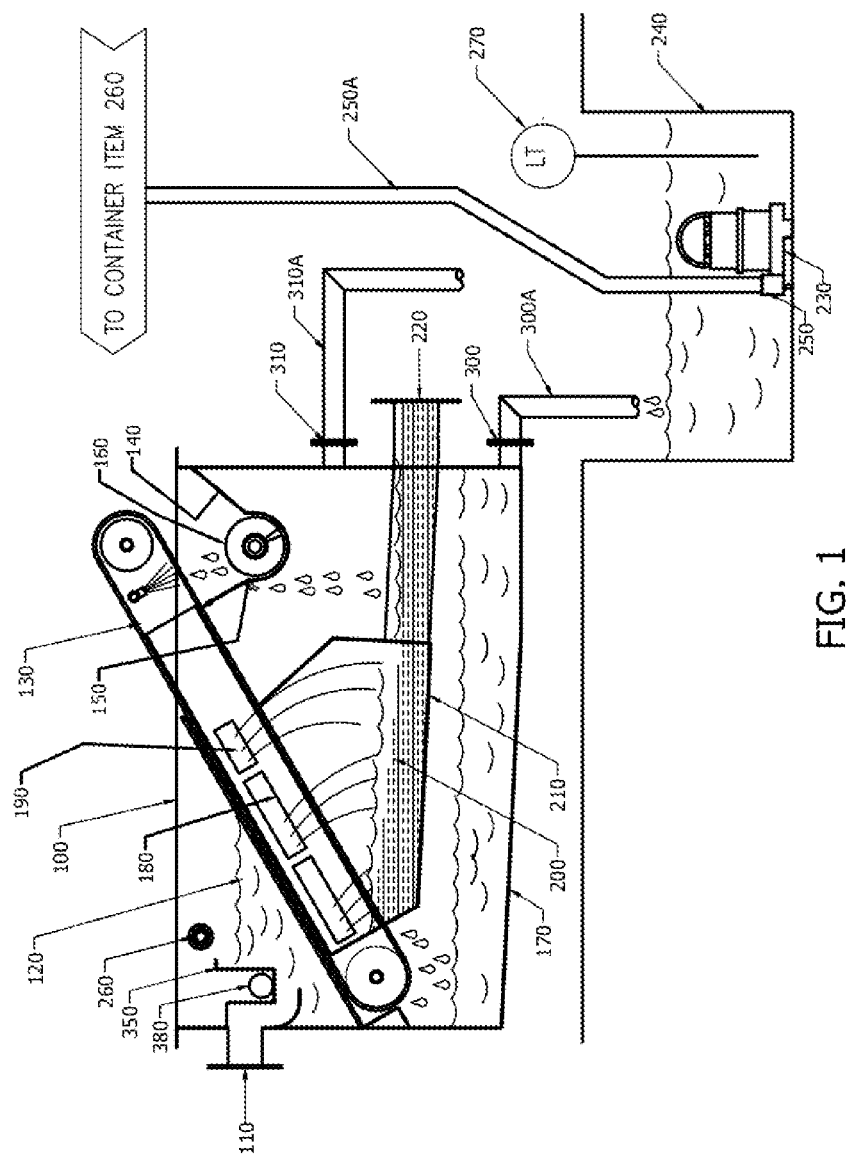
FIG. 1 presents a Liquid Solid Separator Recycling System in a first embodiment disclosed herein.

The following detailed description is merely exemplary in nature and is not intended to limit the described embodiments or the application and uses of the described embodiments. As used herein, the word exemplary or illustrative means serving as an example, instance, or illustration. Any implementation described herein as exemplary or illustrative is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms upper, lower, left, rear, right, front, vertical, horizontal, and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Liquid Solid Separator—Pump Locations

General Solution: There are two general types of pump dispositions that are contemplated: A) liquid solid separators having an internal pump; and B) liquid solid separators that do not have an internal pump. Both of these solutions are directed to handling of reject stream contained in the lower collection basin tank of a liquid solid separator.

Liquid Solid Separator—Internal Pump: First, in a liquid solid separator having an Internal Pump there are several connections added to the lower collection basin tank where the pump is located; these are namely, a drain connection and an overflow connection. As an added measure, provisions can be made to bypass the pump in the event of failure.

Liquid Solid Separator—External Pump: In a second type of system, the sump pump is relocated to a place where the pump is more easily accessible providing a more simple maintenance solution whereby costs are greatly reduced as a result. Also, the External Pump type has several connections added to the lower collection basin tank; these are namely, a drain connection and an overflow connection.

Liquid Solid Separator—System Solutions

There are further two specific classes of system solutions regarding the above general solutions. One class is for Gravity Flow Rotating Belt Filters and the other class is for Pumped Flow Rotating Belt Filters.

Gravity Flow Solutions: Because the lower collection basin tank drain is below the liquid level of the raw influent and filtered outlet, reject from the lower collection basin tank must be pumped unless there is a sufficient differential in liquid level from the Rotating Belt Filter stage outlet (e.g. liquid solid separator having a Rotating Filter Belt) versus the downstream processes that would facilitate a gravity flow solution. If there is sufficient level differential in the downstream process, the reject can be blended with the Rotating Belt Filter effluent using gravity flow without needing to be collected. Otherwise, the reject must be collected and pumped to one of three locations. These locations are defined:

Location 1 is the Rotating Belt Filter housing but specifically above the belt via piping and conduit within the filter system.

Location 2 would be any place upstream of the Rotating Belt Filter liquid solid separator system.

Location 3 would be any location downstream of the Rotating Belt Filter liquid solid separator system (also considered blending but through collecting and pumping).

Pumped Flow Solutions: All the options of gravity flow are available for pumped flow. Additionally, there will normally be an option to drain the reject to a raw water sump in front of the Rotating Belt Filter without collection or need for a separate pump. Collection can either be in a ground pit/sump or in a tank located below the bottom of the lower collection basin. When using an external tank, usually the Rotating Belt Filter System (liquid solid separator device) is raised to achieve the necessary headroom to drain to the external tank.

When using a pump to recirculate reject liquids back upstream of the filter belt, a level sensing device is necessary that communicates with a control system; this control system is able to turn the pump on when needed and turn the pump off when a desired level is achieved based on information provided by the level sensing device through mechanical, electromechanical, electronic and or electrical devices. This is necessary not only to prevent an operator from manually having to control the pump but also to prevent the pump from running dry and overheating. The following different solutions are contemplated:

External Pump Solutions:
1. An External Pump is located in an external collector and pumps back above the Rotating Filter Belt.
2. An External pump is located in an external collector and pumps upstream of the Rotating Belt Filter Belt.

Internal Pump Solutions:
3. Pump Bypass System: a pump is located in the lower collection basin tank with a pump fault detection and bypass system. This fault detection and bypass system detects a pump failure and as a result opens a motor operated valve on the drain that blends reject with Rotating Belt Filter effluent.
4. Pump Bypass System: a pump is located in the lower collection basin tank with a pump fault detection and bypass system. This fault detection and bypass system upon detection of a failure of the pump transmits a command on a control line or electronic bus to to a motor operated valve in order to command the opening thereof. The electric motor operated valve upon receiving the command on a control line or electronic bus opens thereby releasing liquids from the lower collection basin tank to a drain when the pump fails that drains reject to collector and external redundant pump.

Liquid Solid Separator—Embodiments

FIG. 1 presents a Liquid Solid Separator Recycling System in a first embodiment disclosed herein. The drawing generally shows a liquid solid separator which is generally defined by the container 100 on the left having liquids (defined as being comprised of raw unscreened liquid and or solid mixture) flowing into it from the left at inlet 110. The liquids are transmitted by fluid force into an influent basin 120 (at left in container 100) above a rotating filter belt 130 mounted within container 100. Unprocessed liquid solid mixture passes into a collector 140 having overflow weirs 150, where an augur 160 mounted on the container rotates within (or otherwise associated therewith) the collector 140 and a cage (not shown; rotating or otherwise) compacting solids from the liquid solid mixture for outflow out a side door (not shown) of the container 100; also, overflow weirs 150 permit liquids to fall into a lower basin 170 for further processing thereof.

Liquids processed through the rotating filter belt 130 pass there through and on to a diverter panel 180 mounted to the container within the confines of the rotating filter belt 130. This diverter panel 180 having exit windows 190 receives filtered liquids 200 from the rotating filter belt 130; from there the filtered liquids 200 leave the diverter panel through exit windows 190. At this point, the filtered liquids 200 flow into filtered liquid basin(s) 210 (on two sides of the rotating filter belt) having connections between the two sides thereof that proceed to exit the container through an outflow 220. It is understood that there are various other types of components in the general construction of these types of machines such as brushes, cage, motor(s) and so forth. There is an overflow weir 350 welded to the left inside of the container 100 for overflow problems. In the event that influent liquids enter the container 100 at a flow rate faster than can be processed by the filter belt 130, the liquid level will rise to the elevation of the influent section overflow weir 350 and will spill into the overflow trough where they exit the container thru the overflow connection 380. Overflow from the influent section can either be directed to an external sump 240 or blended with the effluent 220.

A pump 230 is located in an external sump (pond, structure or vessel) 240. The pump 230 is connected to a pipe 250A (conduit, hose or similar) at connection 250 (screwed with matching threads between pipe and pump connector, welded or otherwise). The other end of pipe 250A is welded to or otherwise connected (thread to thread connection between pipe 250A and connector 260) to a dedicated tank connector 260 located on a back side of the container 100 above the influent basin 120 such that tank connector 260 is above highest overflow weir 350 and therefore above the maximum normal operating liquid level. A level detection device (LT) 270 (float switch or level transmitter) is located in the external sump (pond, structure or vessel) 240 that is able through a PLC to turn pump 230 on and off based on desired level of the sump 240. Typically, if the sump 240 is too high it turns ON the pump 230 and if the sump 240 it is too low then it turns OFF the pump 230. This operation works in coordination with the needs of a Programmable Logic Controller PLC that receives signals from the Level Detection Device 270 and commands transport of liquids only if there is a need to based upon operational needs. The level detection device 270 has some form of electrical connection to the PLC. These include wired, wireless, electromagnetic, magnetic, infrared, optical or other types thereof. The Sump 240 and its pump 230 is located in a convenient location whereby the external sump 240 can be utilized depending upon the needs of the implementation.

Finally, it should be apparent that there is a lower basin drain line 300A having an integral flanged connector attached to a section of pipe attached to the side of the container 100 that also has its own integral flanged connector; the attachment between these two is made using bolts-nuts or welding at 300. The drain line 300A drains from the lower basin of container 100 into the sump 240. Additionally, there is a lower basin overflow line 310A (located at a right side in the drawing above the outflow 220) that drains into sump 240 for preventing internal liquid solid separator overflows. The lower basin overflow line 310A is connected at 310 using its integral flanged connector that is attached to a section of pipe attached to the side of the container 100 that also has its own integral flanged connector; the attachment between these two flanged connectors is made using bolts-nuts or welding at 310.

Figure 2:
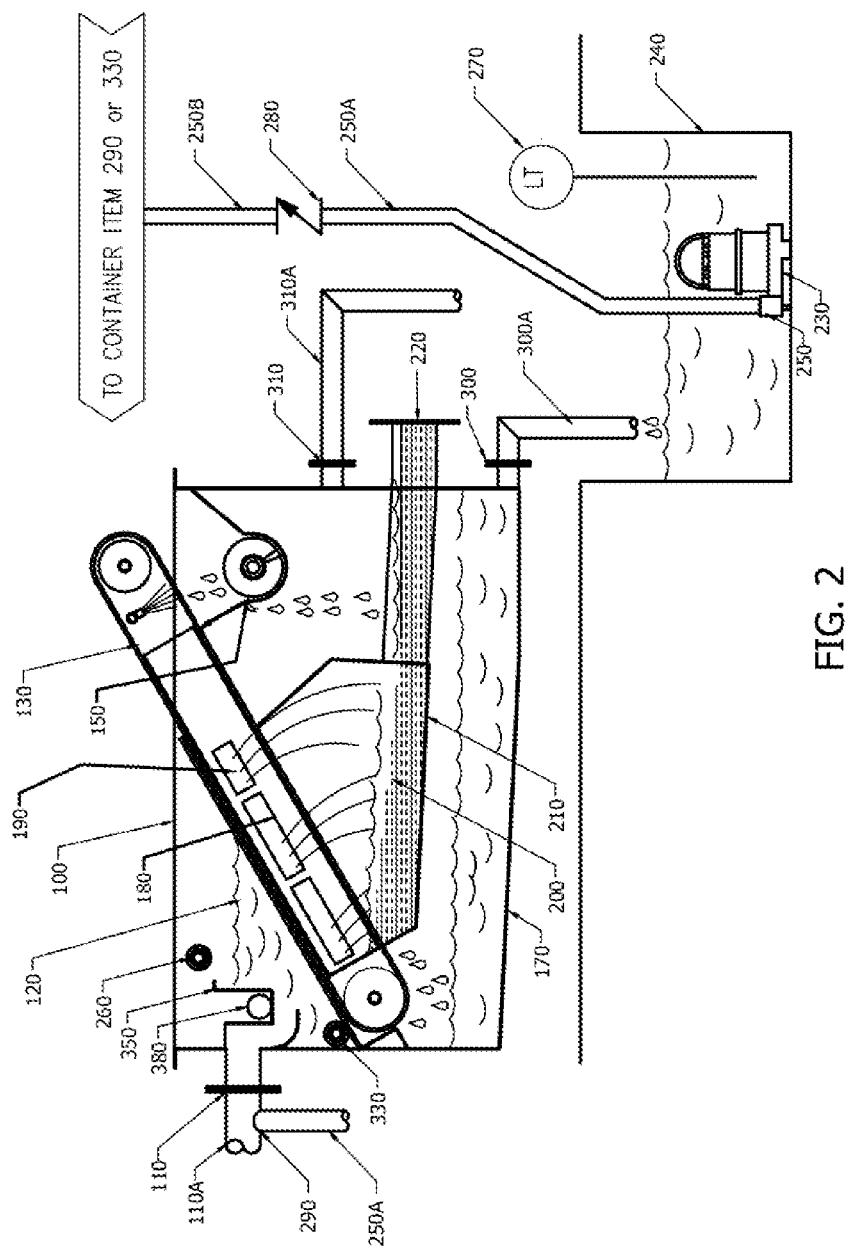
FIG. 2 presents a Liquid Solid Separator Recycling System in a second embodiment disclosed herein.

FIG. 2 presents a Liquid Solid Separator Recycling System in a second embodiment disclosed herein. This embodiment has two potential connections 290 and 330 as described herein below requiring check valves. This figure presents a side view of the liquid solid separator container 100 showing the fluid flow. The Sump 240 and its pump 230 is located in a convenient location whereby the external sump 240 can be utilized depending upon the needs of the implementation. In this embodiment of the invention, the previous embodiment is modified in that the pipe from pump 230 returns to another point on container 100 and is made of two pipes or two segments 250A-250B together where now it is pipe segment 250B that returns to a connector/connection of the liquid solid separator.

There are two possible connections (connectors) which are welded or otherwise connected to pipe segment 250B; the first of these is an end of pipe segment 250B welded to connection 330 which is a hole (or threaded hole for matching connection to a threaded end of pipe segment 250B) on the back side of the container 100. Of course, the other end of pipe 250B is to a check valve 280 as described below. The other one a welded a connection 330 described in the following.

Here an end of pipe 250B has a welded connection (or otherwise such as thread to thread connection between pipe 250B and inlet pipe 110A (to inlet pipe 110A at an opening 290 in the inlet pipe 110A). The inlet pipe 110A providing influent into the container 100 has an integral flange that is connected at 110 to an integral flanged end of another pipe; the another pipe's other end opposite the another pipe's flanged end is welded or otherwise connected to the left side of the container thereby providing liquid solid mixture to the influent basin.

The first pipe segment 250A is connected to pump 230 at an end thereof at 250 and at its other end with a first part of a check valve 280. This check valve 280 is inserted between this first pipe segment 250A (from the pump to the check valve 280) and a second pipe segment 250B (from the check valve 280 to a connection 290 to inlet pipe 110A). A first end of the second segment 250B is connected to the check valve 280 and it second end has a welded connection at 290 (or otherwise such as thread to thread connection between pipe 250B and inlet pipe 110A) so materials can flow through an opening in inlet pipe 110A for this purpose therein.

The check valve 280 is utilized to prevent influent basin unscreened liquids from by-passing and going through the pipe now 250A-B to the reject sump (240). However, if the sump pump is the same pump that feeds the filter raw influent liquids (raw unscreened liquid and or solid mixture in front of the rotating filter belt 130 at influent basin 120), then a check valve 280 is not necessary. A level detection device (LT) 270 is (float switch or level transmitter) located in the external sump (pond, structure or vessel) 240 that is able to turn pump 230 on and off based on desired level of the sump 240. Typically, if the sump 240 is too high it turns ON the pump 230 and if the sump 240 it is too low then it turns OFF the pump 230. This operation works in coordination with the needs of a Programmable Logic Controller PLC that receives signals from the Level Detection Device 270 and transports new liquids only based upon operational needs.

The level detection device 270 has some form of electrical connection to PLC. These include wired, wireless electromagnetic, magnetic, infrared, optical or other types thereof. The Sump 240 and its pump 230 is located in a convenient location whereby the external sump 240 can be utilized depending upon the needs of the implementation. Finally, it should be apparent that there is a lower basin drain line 300A which drains the lower basin into the sump 240 as described previously; additionally, there is a lower basin overflow line 310A that drains into sump 240 for preventing internal liquid solid separator overflows as described previously.

Figure 3A:
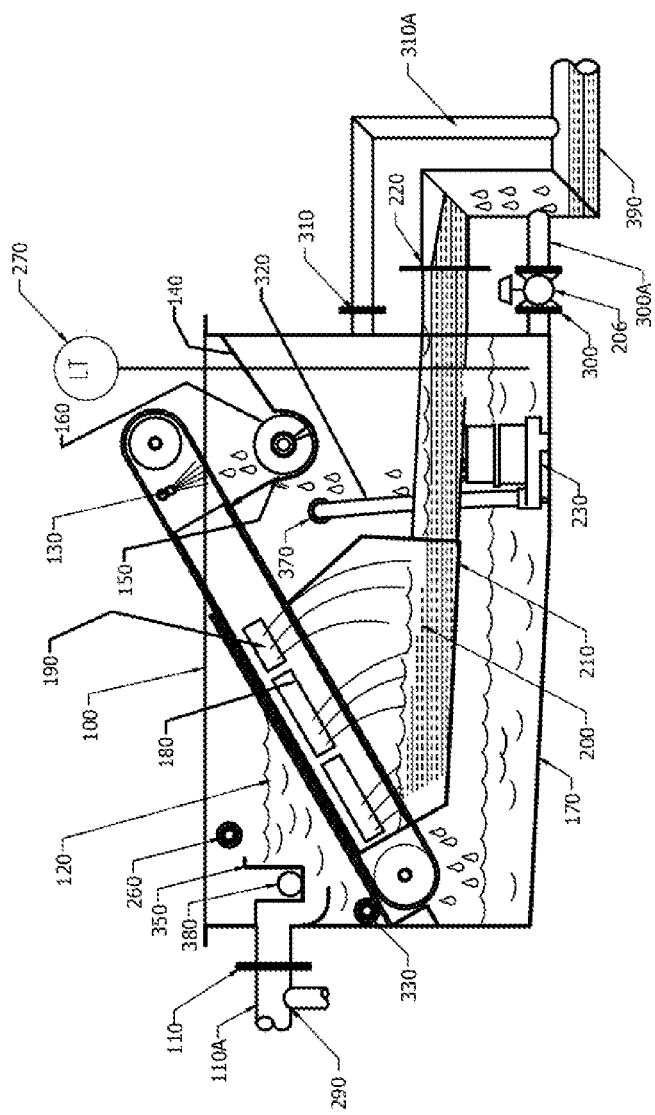
FIG. 3A presents a front view of a Liquid Solid Separator Recycling System in an embodiment disclosed herein made up of three potential variations described in FIG. 3B, 3C, 3D.
Figure 3B:
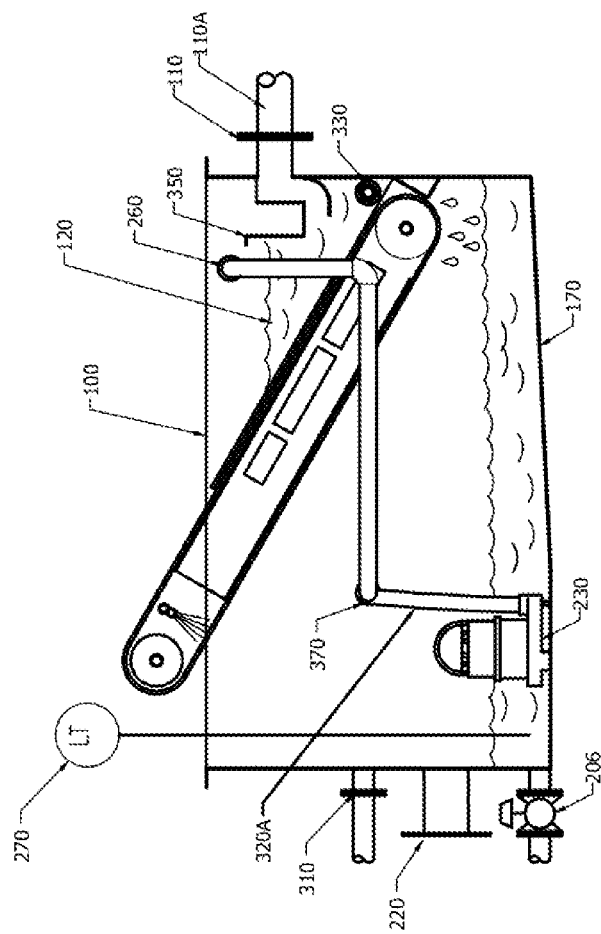
FIG. 3B presents a rotated view of the Liquid Solid Separator Recycling System of FIG. 3A in a third embodiment disclosed herein.
Figure 3C:
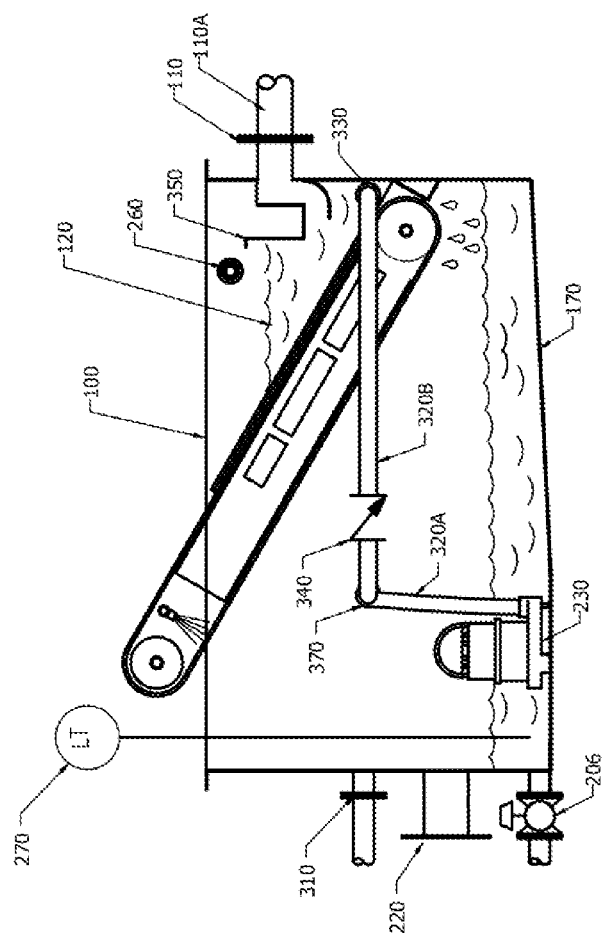
FIG. 3C presents a rotated view of the Liquid Solid Separator Recycling System of FIG. 3A in in a fourth embodiment disclosed herein.
Figure 3D:
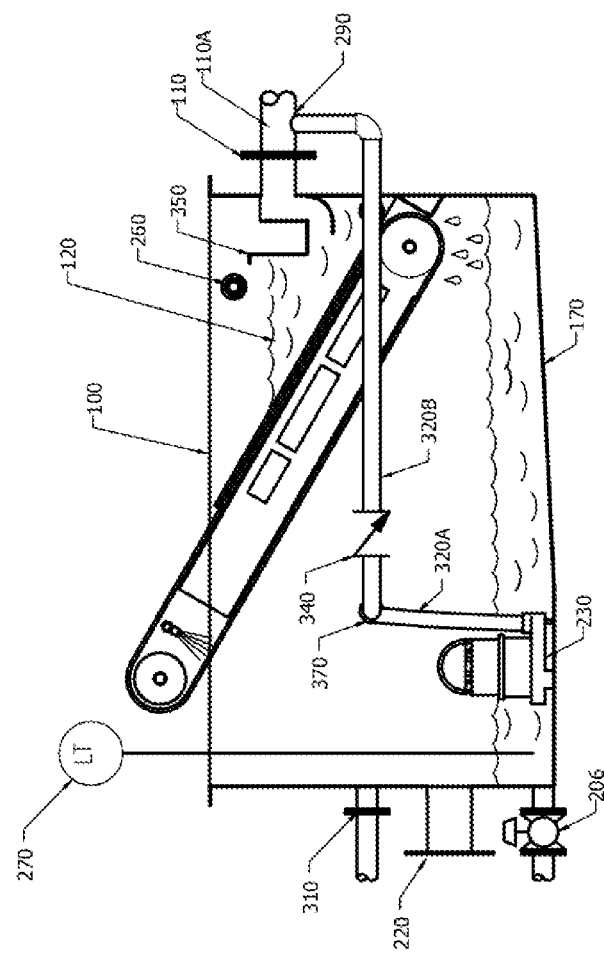
FIG. 3D presents a rotated view of the Liquid Solid Separator Recycling System of FIG. 3A in a fifth embodiment disclosed herein.

FIG. 3A presents a front section view of a Liquid Solid Separator Recycling System in an embodiment disclosed herein made up of three potential variations described in FIG. 3B, 3C, 3D. FIG. 3A presents a front section view of the liquid solid separator tank showing the fluid flow. FIG. 3A represents three configurations with no external sump having a fault detection system that allows for pump by-pass via blending reject with effluent during pump failure to prevent equipment downtime. There are three possible termination points for the pump recycle that are not clearly shown in FIG. 3A, but the pump could go to 260, 290 or 330 and these are shown in more detail in FIGS. 3B, 3C and 3D.

This embodiment differs from the first two in that the pump 230 is located internally to the liquid solid separator container 100 and is situated within the lower basin 170 which receives reject streams from the collector 140 and from portions of the rotating filter belt 130 in the figure. The pump 230 has a pipe 320 that recycles liquids from the lower basin 170 up towards one of three points. These are namely, i) a connector 330 on the back side of container 100 below the overflow weir 350 (and within the zone considered the influent basin) above and near where the forward lowest portion of the recirculating belt approaches the left side of the container 100; ii) a connector 260 above the overflow weir 350 and above the zone of the influent basin and above the rotating filter belt; and iii) a connector to inlet pipe 110A at an opening therein at 290 welded to the inlet pipe 110A. The connector 330 is utilized to agitate solids within the influent basin thereby preventing undesirable accumulation at this lowest point therein.

For a connection from the pump 230 and ultimately to inlet 110, it should be apparent that a back flow of the raw liquids flowing through 110 to the pump 230 is an undesirable situation. Thus, a check valve 340 (for example, shown in FIG. 3D) is inserted within the piping to prevent this possibility and thus uses two pipe segments 320A-320B as follows (or a single pipe 320A if it is practical to insert it directly within the pipe itself). The check valve 340 is inserted between this first pipe segment 320A (from the pump to the check valve 340) and a second pipe segment 320B (from the check valve 340 to 290 connector opening at inlet pipe 110A) whose other end is attached or welded to an opening in the inlet pipe 110A for this purpose. A first end of the second segment 320B has a first end connected to the check valve 340 and its second end has a welded connection 290 (or otherwise such as thread to thread connection between pipe 320B and inlet pipe 110A) to inlet pipe 110A through an opening for this purpose therein. Pipe 320 (whether as a group of pipe segments 320A-B welded together or as a single pipe) goes out hole 370 in container 100 and once outside container the pipe 320 (or segments 320A-B depending upon where the designation of 320A-320B ends) goes to a connection where the end of either 320 in some embodiments or 320B in segments connects to.

A level detection device (LT) 270 (float switch or level transmitter) is located in the lower basin 170 that communicates information to a PLC that is able to turn pump 230 on and off based on desired level of the lower basin 170. Typically, if the lower basin 170 is too high it turns ON the pump 230 and if the lower basin 170 it is too low then it turns OFF the pump 230. This operation works in coordination with the needs of a Programmable Logic Controller PLC that receives signals from the Level Detection Device 270 and controls liquids based upon operational needs. The level detection device 270 has some form of electrical connection to the PLC. These include wireless, wired, electromagnetic, magnetic, infrared, optical or other types thereof. The PLC is able to detect problems with the pump, either by detecting a high level above normal operating levels or by a fault detection device on the pump. When a pump fault is detected or too high level in basin 170, the PLC is capable of opening an automated valve (206) and by-passing the pump by allowing the reject to blend with the effluent.

The valve 206 is attached at 300 to a pipe attached a first end (typically welded) to an opening in the right side of container 100 and at its other end to valve 206. The valve 206 other end is attached to a pipe 300A; this pipe 300A has another end attached (typically welded) to an opening in an effluent pipe 390 flowing from the outflow 220; this outflow 220 is a pipe having a first end welded to the right side of container and its flanged other end attached to an effluent pipe 390 flanged end. Finally, the lower basin overflow line 310A is connected at 310 using its integral flanged connector that is attached to a pipe attached to the side of the container 100 that also has its own integral flanged connector; the attachment between these two integral flanged connectors is made using bolts-nuts or welding at 310. The lower basin overflow line 310A is attached at another end to an opening in the effluent pipe 390 through welding or similar connection.

FIG. 3B presents a rotated section view of the Liquid Solid Separator Recycling System of FIG. 3A in a third embodiment disclosed herein. FIG. 3B represents one configuration with internal sump pump going to 260.

The pump 230 is attached to a pipe 320A that recycles liquids from the lower basin 170 up towards a connector 260 (a hole to which pipe 320A is typically welded to). In order to arrive at this connector 260, the pipe 320A proceeds through a hole 370 in the back side of container outside of container 100 and using an L shaped section of this pipe is connected to connector 260. Connector 330 is blinded or blocked in this implementation but could be used if desired by a user.

In the event of a pump failure, the liquid in the lower basin 170 would rise and risk fouling the treated liquids leaving the container through outflow line 220. A PLC is provided that is able to detect problems with the pump, either by detecting a high level above normal operating levels or by a fault detection device on the pump. Therefore, the level detection device (LT) 270 (float switch or level transmitter) senses the rising of the liquid reject within the lower basin 170. It transmits a signal to the PLC which in turn communicates through wired or wireless communication to electronically controls the OPEN and CLOSED state of electromechanical valve 206. Thus, the system by-passes the pump by allowing the reject from lower basin 170 to blend with the effluent where effluent liquids and reject liquids from the lower basin are mixed such that outflow line 220 treated liquids and reject liquids mix at a connection (not shown) between a pipe 390 connected to outflow line 220 externally to container 100, and a reject line connected to the valve 206 connected to pipe 390 as described previously.

FIG. 3C presents a rotated section view of the Liquid Solid Separator Recycling System of FIG. 3A in a fourth embodiment disclosed herein. FIG. 3C represents one co figuration with internal sump pump going to 330 with check valve. FIG. 3C presents a similar disposition of elements as 3B with the two differences: i) a check valve 340 is attached between two sections 320A, 320B of pipe 320 (collectively pipe 320); and ii) the pipe 320, specifically section 320B is attached to connector 330. This connector 330 is typically an opening in back side of container 100 to which pipe 320 is attached; it can also be welded/bolted/thread to thread connection. The connector 330 is situated below the another connector 260 which is located on the same side of container 100 as the connector 330 where connector 260 is above weir 350 and connector 330. In this embodiment the connector 260 is blinded or closed but is still available for some other use in the event a user wishes to use it.

Connector 330 is located near or at the lowest (and near or at narrowest) possible point (in the influent basin region) between the filter belt lowest end in container 100 and the corresponding side of the container 100 facing the filter belt. Pipe section 320A is connected to the pump and exits the back side of the container 100 at 370 opening (hole) and is attached to the check valve 340 whilst section 320B is connected to check valve 340 and to connector 330. The operation is the same as FIG. 3C with the addition that since there is a check valve 340 then liquids in the influent basin above the filter belt are prevented from flowing back through the pipe 320 to pump 230.

FIG. 3D presents a rotated section view of the Liquid Solid Separator Recycling System of FIG. 3A in a fifth embodiment disclosed herein. FIG. 11D represents one configuration same as 3C except the recycle is connected to external piping at 290. FIG. 3D presents a similar disposition of elements as 3C with the difference being: the pipe 320 (specifically section 320A) passes through an opening 370 (a hole through which pipe 320 passes) in the side of container 100 and is attached to a check valve 340. The pipe 320 section 320B is attached to a check valve 340 and its L shaped portion is connected to an opening in inlet pipe 110A. Here, a portion of the pipe (320B) has a welded connection (or otherwise such as thread to thread connection) between pipe section 320B and inlet pipe 110A at an opening 290 in the inlet pipe 110A. The inlet pipe has a flanged welded/bolted connection to inflow small pipe at 110.

Figure 4:
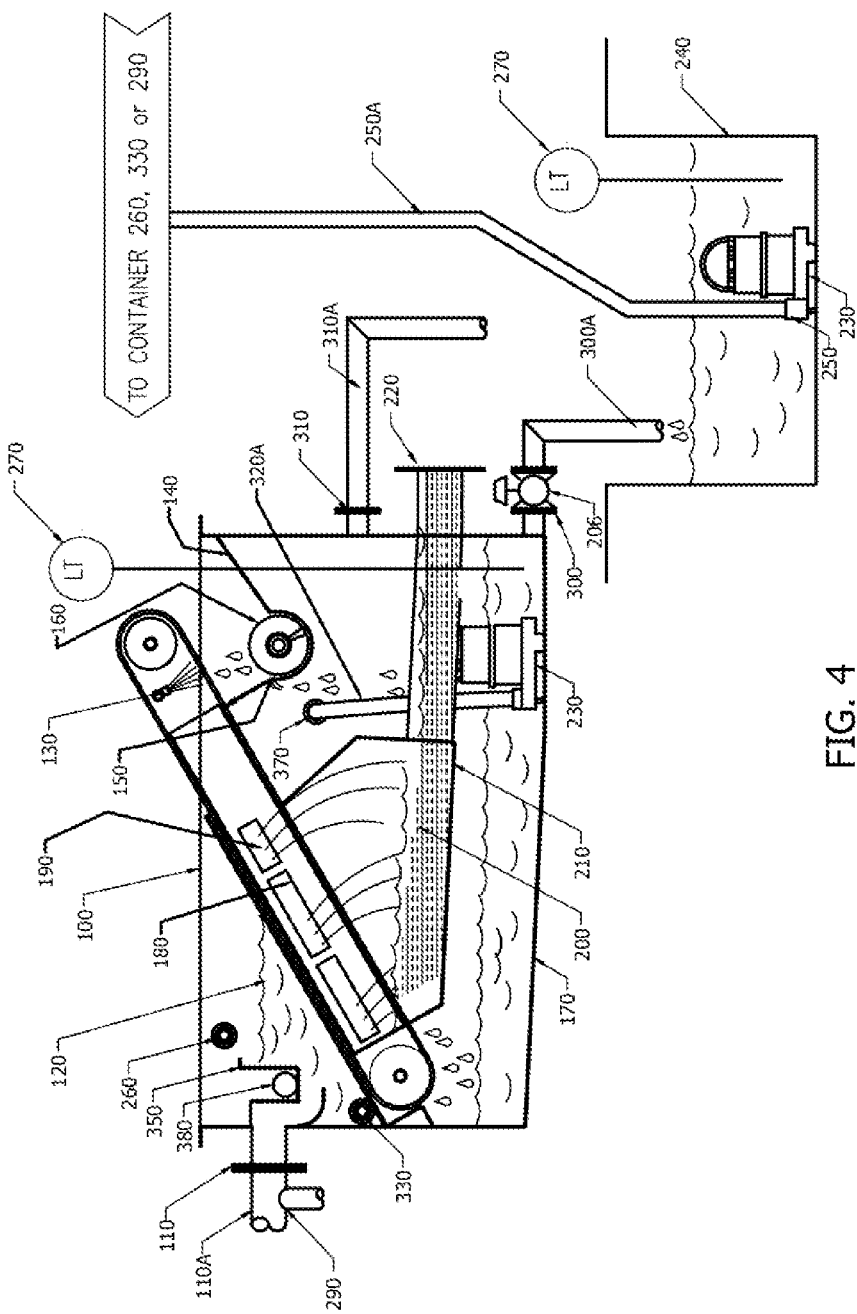
FIG. 4 presents a Liquid Solid Separator Recycling System in a sixth embodiment disclosed herein.

FIG. 4 presents a Liquid Solid Separator Recycling System in a seventh embodiment disclosed herein on the side of container 100. FIG. 4 represents redundant pump both internal and external and represents six configurations. The check valve isn't shown but implied for connection to 330 and 290. Thus, the various attachments could be made at any one of the possible connections provided as is already implied from the sketch. There are six possible connection variations with IP meaning internal pump connection, EP meaning external pump connection: 1) IP 260 EP 290, 330 blocked; 2) IP 260 EP 330, 290 blocked; 3) IP 290 EP 260, 330 blocked; 4) IP 290, EP 330, 260 blocked; 5) IP 330 EP 260, 290 blocked; 6) IP 330 EP 290, 260 blocked.

This embodiment is a modification of the first with the differences being: i) there are three return paths for liquids from external pump 230 situated in sump 240 that end in one of connections/connectors 260, 290 and 330; ii) the addition of an internal pump 230 within the lower basin of container 100 using one of the unused return paths to an unused connection/connector not used by the external sump 240 pump 230; and iii) the lower basin drain line has an automated valve 206 (controlled by the PC) within it to control the path of liquids therein. It should be appreciated that any unused connections/connectors 260, 290, 330 would be blinded/blocked in this or other embodiments.

Again the pipe 320A section passes through the hole 370 in the back side of the container to one of the unused return paths to a connection/connector 260, 290, 330. The connector 330 is situated below the another connector 260 which is located on the same side of container 100 as the connector 330 where connector 260 is above weir 350 and connector 330. Connector 330 is located near or at the lowest (and near or at narrowest) possible point between the filter belt lowest top portion facing the influent basin and the corresponding side of the container 100 facing the filter belt. Pipe section 320A is connected to the internal pump 230 within lower collection basin 170 and passes out through a hole 370 in the back side of container 100 to one of the unused connector/connections 260, 290, 330.

Care should be taken that if the connector/connection is under the liquid level of the influent basin then a check valve is used in the piping to prevent back flow. For example, a check valve 340 is inserted between this first pipe segment 320A (from the pump to the check valve 340) and a second pipe segment 320B (from the check valve 340 to a connection 290 to inlet pipe 110A). A first end of the second segment 320B has a first end connected to the check valve 340 and it second end has a welded connection 290 (or otherwise such as thread to thread connection between pipe 250B and inlet pipe 110A) to inlet pipe 110A through an opening for this purpose therein. The check valve 340 is utilized to prevent influent basin unscreened liquids from by-passing and going through the pipe 320B to the pump 230. However, if the pipe 320A from the pump 230 inside the container 100 is to connector 260, then it proceeds as shown in FIG. 3B through a hole 370 without a second pipe 320B. Also, the other connector/connection 260, 290, 330 would remain unused. The various six combinations described above are possible and would have back flow preventer or check valves if the liquid level could cause a back flow through the piping to a pump. As an alternative, the valve could be located integrally within the pipe so there would be a single pipe line 320A instead of the two for a valving system.

When the Level Detection Device 270 (level sensor) detects that liquids in the lower basin 170 are too high (or that the pump has failed through a control system or dedicated electric summation circuit) it transmits a signal to the PLC of the system informing it of this fact. As a result the PLC transmits an OPEN signal to valve 206 on lower basin drain line 300. This signal can be direct to a valve microcontroller or electronic circuitry controlling the electric motor of the valve. When level detection device (LT) 270 (float switch or level transmitter) detects that the liquids in the lower collection basin 170 are too low (or that the pump is working again through a control system or dedicated electric summation circuit) then it transmits a CLOSE signal to check valve 206 to resume normal operation.

A second level detection device 270 located in sump 240 also determines the level of liquid within external sump 240 therein. In the event that this level detection device 270 determines too high a level for the external sump 240, then it sends a signal to the PLC associated with the liquid solid separator warning of an external problem through a marked light on the panel or computer display warning that the external sump 240 has an overflow problem.

Figure 5:
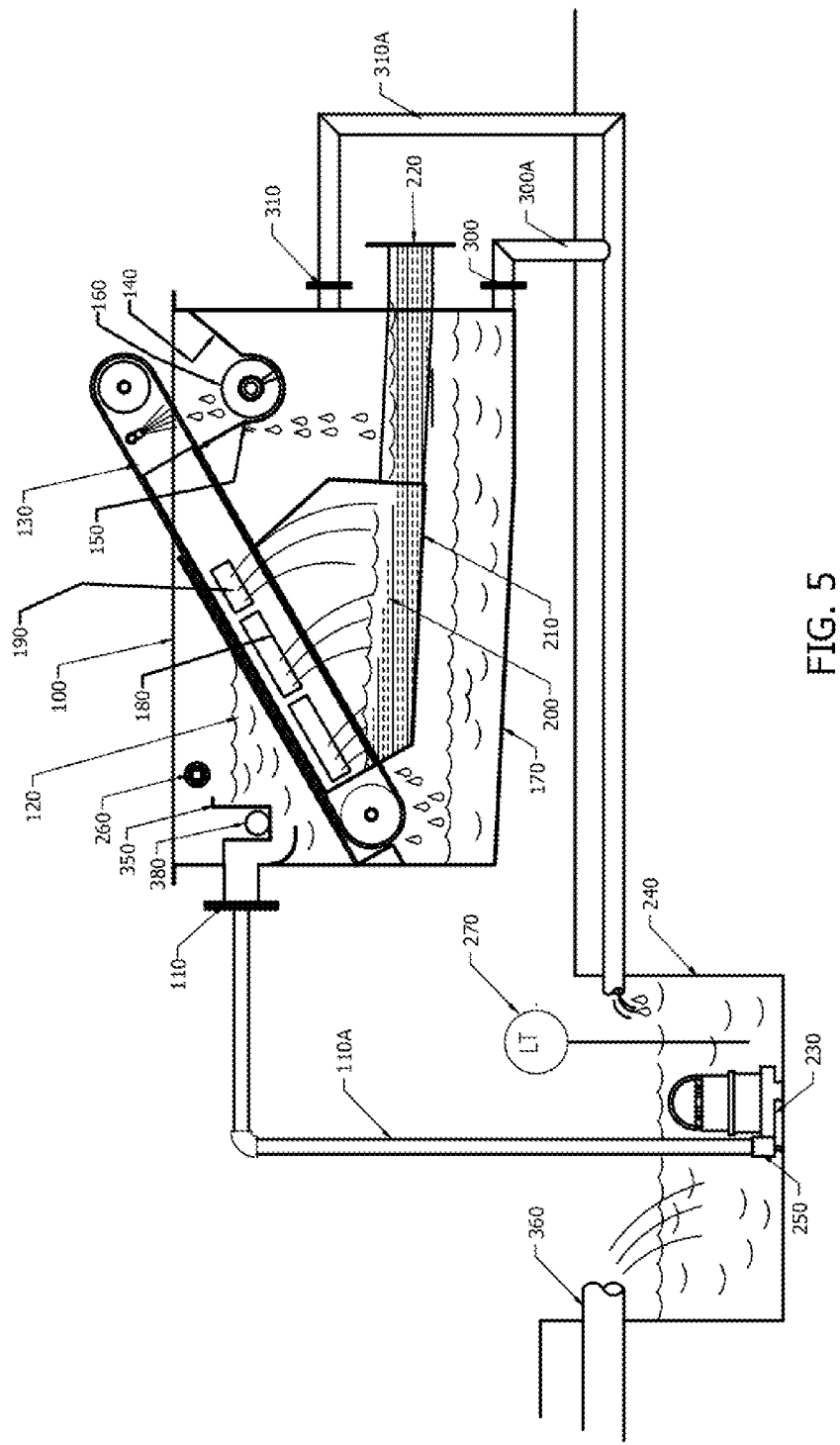
FIG. 5 presents a Liquid Solid Separator Recirculation System in a seventh embodiment disclosed herein.

FIG. 5 presents a Liquid Solid Separator Recycling System in an eighth embodiment disclosed herein. FIG. 5 represents the configuration where the pump is in fact the primary influent pump. Since the primary pump is being used for the recycle and there is no second pump and a check valve is not required.

This embodiment is a variation of that shown in FIG. 1 with these distinct differences: i) pump 230 is attached at 250 to a pipe 110A and situated within an external sump 240 wherein the pipe 110A is directly attached to inlet 110 through welding, dual flanged bolt, thread to thread connection or similar connection; ii) overflow pipe 310A is connected to a side of container 100 at 310 and this pipe 310A empties into external sump 240; ii) lower collection basin drain line 300 has a pipe 300A connected thereto; this pipe 300A has an end that is welded or otherwise attached to an opening in the side of overflow pipe 310A so that it also empties to the sump 240. Municipal provided liquids or otherwise sourced liquids are provided for refilling the external sump 240 using pipe 360.

When Level Detection Device 270 situated in sump 240 determines that liquids level in sump 240 are too low then it transmits this fact to a PLC controlling the operation of the Liquid Solid Separation for presentation to a user display. Similarly, when Level Detection Device 270 situated in sump 240 determines that liquids level in sump 240 are available or too high then it transmits this fact to a PLC controlling the operation of the Liquid Solid Separation for presentation to a user display.

Figure 6:
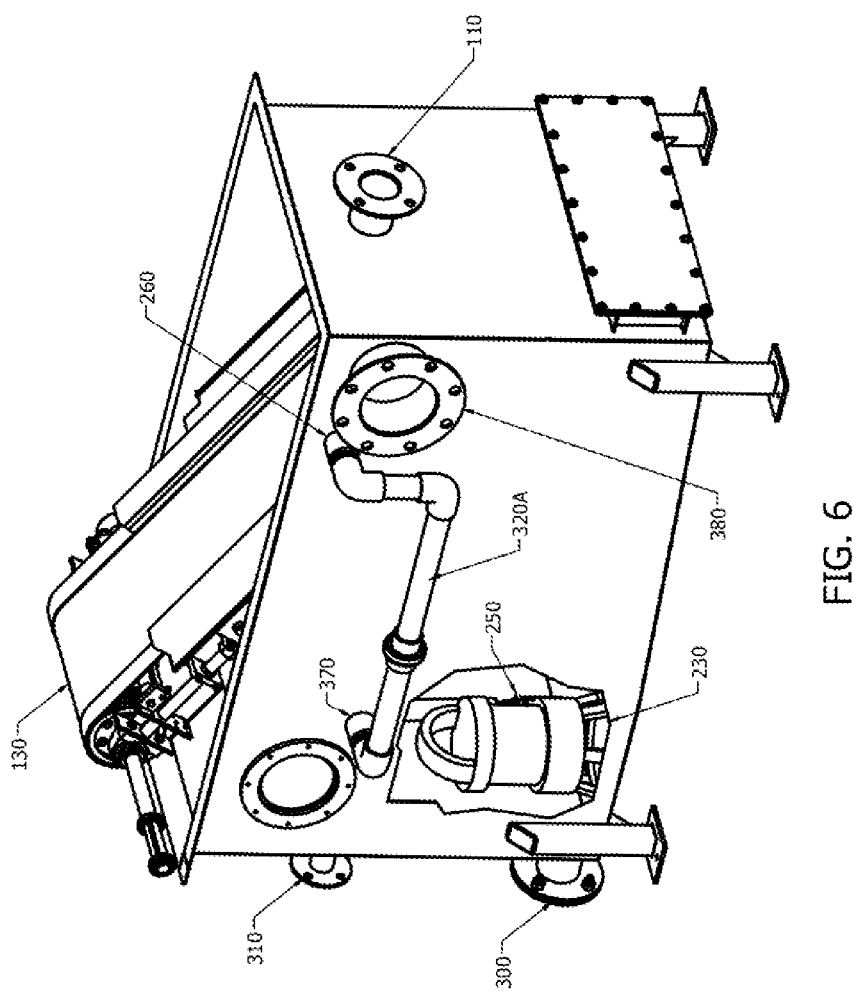
FIG. 6 presents an isometric view of a Liquid Solid Separator Recycling System Container disclosed herein showing the recycling pipe on a side thereof returning liquids above the influent basin above the rotating filter belt.

FIG. 6 presents an isometric view of a Liquid Solid Separator Recycling System Container disclosed herein showing the recycling pipe on a side thereof returning liquids above the influent basin above the rotating filter belt to connector 260. Here the pipe 320A attached to an internal pump exits the container through a hole 370 therein (could be welded, fitting, bracketed or otherwise attached to hole 370). The pipe is made of several portions and fittings to arrive at the connector 260. However, it could be a single pipe that has been made from machined, bent metal and or plastic extrusion passing through a hole 370 to arrive at connection/connector 260.

OTHER CONSIDERATIONS

It is intended that the above novel embodiments be utilized with appropriate connection the Liquid Solid Separator System taught in U.S. patent application Ser. No. 14/470,794 filed on 27 Aug. 2014.

A liquid solid separator has a main container wherein a rotating filter belt receives influent for liquid sold mixture sieve processing. Various recirculation systems are proposed including an external pump sump recirculation, internal pump recirculation and dual pumps with one disposed externally in a sump and one internally in the lower basin of the container. Recirculation points include an inflow pipe connection, an influent basin connection located above the influent basin, and an influent basin connection located under the liquid solid mixture influent level. The influent basin connection location under the liquid solid mixture influent level is typically the lowest level between the container wall facing the angled portion of the rotating filter belt and the angled portion of the rotating filter belt.

Thus, when looking at FIG. 1, for example, a portion of rotating filter belt 130 receiving liquid solid mixture from the left in the figure is a hypotenuse of a hypothetical triangle; also, the container wall facing this portion of rotating filter belt (RFB) 130 is an adjacent hypothetical side of this hypothetical triangle and when lines are drawn by downwards extension they meet at a point and as near as practical between the RFB 130 and the wall forms a location for placement of a connector on a back side of the container 100.

Check Valve: A check valve is defined as any device designed to restrict flow of liquids and or liquid solid mixtures to one direction down a pipe, hose or other channel. For example, a check valve can alternatively be replaced with an electric automated ball valve that only opens when the pump is on. Additionally, the check valve can alternatively be physically inserted within a single pipe itself rather than two pipe segments.

Unused Connections: It should be appreciated that any unused connections/connectors 260, 290, 330 would be blinded/blocked in this or other embodiments. Of course, they could be reopened and utilized if desired by the end user.

Priorities: Other Connection 260 is the preferred connection because it eliminates the need for a check valve and therefore is the most efficient place for the recycle operation. Connection 330 may be desired in order to agitate the lower portion of the influent basin where solids could settle in certain applications with heavy solids. Connection 290 may be desired when piping and location are advantageous. For example, if the external sump is located a far distance from the container, but the influent pipe 110A is located nearby, it may be feasible to make the connection on the pipe in local proximity rather to run a dedicated pipe to the container. FIG. 11D illustrates that the recycle could be placed in any of the locations.

In any embodiment attachments at connections/connectors 260, 290, 330 are welded, screw on thread to thread, bracket or otherwise.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A rotating belt filtration system comprising:
    a container (100);
    a sump (240) external to, and elevationally lower than the container (100);
    an endless, inclined, rotating filter belt (130) disposed within the container (100) dividing the container (100) into an upper influent basin (120) and at least one filtered liquid basin (210) for receiving filtered liquid (200) which has passed by gravity through the rotating filter belt (130);
    a lower collection basin (170) beneath the filtered liquid basin (210) and in fluid communication with a drain line (300A) for draining accumulated liquid from the lower collection basin (170) of container (100) into the sump (240);
    an outflow pipe (220) permitting egress of filtered liquid (200) from the at least one filtered liquid basin (210); and
    a pump (230) located in the sump (240) having a recirculation pipe (250a) attached thereto wherein the recirculation pipe (250a) is also attached to a connector (260) on the container (100) for delivering recirculated fluid to the upper influent basin (120).

2. The rotating belt filtration system of claim 1, further comprising:
    an overflow weir (350) attached to the inside of the container (100) where excess liquid in the influent basin flows over the overflow weir (350), and into an overflow trough, and then exits the container thru an overflow connection (380).

3. The rotating belt filtration system of claim 1, further comprising:
    a liquid level detection device (270) located in the external sump (240) that is capable of turning pump (230) on and off in response to a predetermined liquid level in the sump (240).

4. The rotating belt filtration system of claim 3, wherein the liquid level detection device (270) comprises a float switch.

5. The rotating belt filtration system of claim 3, wherein the liquid level detection device (270) comprises a liquid level transmitter.

6. The rotating belt filtration system of claim 1, further comprising:
    a diverter panel (180) mounted to the container (100) and within an interior of the rotating filter belt (130), the diverter panel (180) having exit windows (190) through which filtered liquid (200) from the rotating filter belt (130) flows into the at least one filtered liquid basin (210).

7. The rotating belt filtration system of claim 6, wherein, the at least one filtered liquid basin (210), comprises two filtered liquid basins (210), one on each side of the rotating filter belt (130).

8. The rotating belt filtration system of claim 7, wherein, the two filtered liquid basins (210) have fluid flow connections between the two sides thereof that permit fluid to exit the container through the outflow (220).

9. The rotating belt filtration system of claim 2, wherein, the connector (260) is above the influent basin (120) such that connector (260) is above the overflow weir (350) and therefore above the maximum normal operating liquid level.

10. The rotating belt filtration system of claim 1, further comprising:
    a check valve (280) fluidically connected to the recirculation pipe (250a) for preventing fluid from flowing back through the recirculation pipe (250a).

11. A rotating belt filtration system comprising:
    a container (100);
    a sump (240) external to, and elevationally lower than the container (100);
    an endless, inclined, rotating filter belt (130) disposed within the container (100) dividing the container (100) into an upper influent basin (120) and at least one filtered liquid basin (210) for receiving filtered liquid (200) which has passed by gravity through the rotating filter belt (130);
    a lower collection basin (170) beneath the filtered liquid basin (210) and in fluid communication with a drain line (300A) for draining accumulated liquid from the lower collection basin (170) of container (100) into the sump (240);
    an outflow pipe (220) permitting egress of filtered liquid (200) from the at least one filtered liquid basin (210); and
    a pump (230) located in the sump (240) having recirculation piping including two segments:
        a first pipe segment (250a); and a second pipe segment (250b);
wherein the first pipe segment (250a) is fluidically connected to the pump (230) at one end, and is connected to a back flow preventer (280) at the other end, and the second pipe segment (250b) is connected to the back flow preventer (280) at one end, and is in fluid communication with the upper influent basin (120) such that recirculated fluid from the sump (230) may be introduced into the upper influent basin (120).

12. The rotating belt filtration system of claim 11, further comprising:
an overflow weir (350) attached to the inside of the container (100) where excess liquid in the influent basin flows over the overflow weir (350), and into an overflow trough, and then exits the container thru an overflow connection (380).

13. The rotating belt filtration system of claim 11, further comprising:
a liquid level detection device (270) located in the external sump (240) that is capable of turning pump (230) on and off in response to a predetermined liquid level in the sump (240).

14. The rotating belt filtration system of claim 13, wherein the liquid level detection device (270) comprises a float switch.

15. The rotating belt filtration system of claim 13, wherein the liquid level detection device (270) comprises a liquid level transmitter.

16. The rotating belt filtration system of claim 11, further comprising:
a diverter panel (180) mounted to the container (100) and within an interior of the rotating filter belt (130), the diverter panel (180) having exit windows (190) through which filtered liquid (200) from the rotating filter belt (130) flows into the at least one filtered liquid basin (210).

17. The rotating belt filtration system of claim 16, wherein, the at least one filtered liquid basin (210), comprises two filtered liquid basins (210), one on each side of the rotating filter belt (130).

18. The rotating belt filtration system of claim 17, wherein, the two filtered liquid basins (210) have fluid flow connections between the two sides thereof that permit fluid to exit the container through the outflow (220).

19. The rotating belt filtration system of claim 11, further comprising a connector placing sump (240) recirculation piping in fluid communication with the upper influent basin (120), the connector comprising at least one of:
a lower connector (330) attached to the container (100) at a lowest point in the upper influent basin (120);
an upper connector (260) attached to the container (100) located at an upper point in the upper influent basin (120); and
an intermediate connector including an opening (290) in an inlet pipe (110A) for introduction of recirculated fluids into the upper influent basin (120) at a position beneath a weir (350) attached to the container (100).

20. The rotating belt filtration system of claim 11, wherein the second segment (250b) is in fluid communication with an inlet pipe (110a) via an opening (290) in an inlet pipe (110A) for introduction of recirculated fluids into the upper influent basin (120).

* * * * *